United States Patent [19]
McGarry

[11] Patent Number: 4,650,425
[45] Date of Patent: Mar. 17, 1987

[54] TECHNOLOGY TEACHING APPARATUS

[75] Inventor: Jerome McGarry, Ballymena, Ireland

[73] Assignee: Economatics (Education) Limited, Sheffield, England

[21] Appl. No.: 718,227

[22] Filed: Apr. 1, 1985

[30] Foreign Application Priority Data

Nov. 22, 1984 [GB] United Kingdom ................ 8429552

[51] Int. Cl.⁴ .............................................. G09B 25/02
[52] U.S. Cl. .................................... 434/219; 248/639; 248/645; 434/224; 434/379; 434/389; 434/401
[58] Field of Search ............... 434/219, 224, 365, 430, 434/108, 72, 300, 301, 302, 303, 379, 380, 389, 401; 248/637, 639, 645, 673

[56] References Cited
U.S. PATENT DOCUMENTS

| 2,983,892 | 5/1961 | Williams | 434/301 X |
| 3,344,535 | 10/1967 | Poesl | 434/380 |
| 3,522,666 | 8/1970 | Sarthou | 434/108 |
| 3,704,527 | 12/1972 | Berkman | 434/401 |

FOREIGN PATENT DOCUMENTS

| 1572928 | 12/1970 | Fed. Rep. of Germany | 434/224 |
| 2229512 | 12/1974 | France | 434/224 |

Primary Examiner—William H. Grieb
Attorney, Agent, or Firm—William R. Hinds

[57] ABSTRACT

A system of technology teaching equipment including a support structure providing both horizontally and vertically disposed support areas with means for the removable attachment of components, the support areas including T-slots for the engagement of complementary parts of the components or of mounting brackets therefor, and/or for the engagement of the heads of respective fasteners.

10 Claims, 21 Drawing Figures

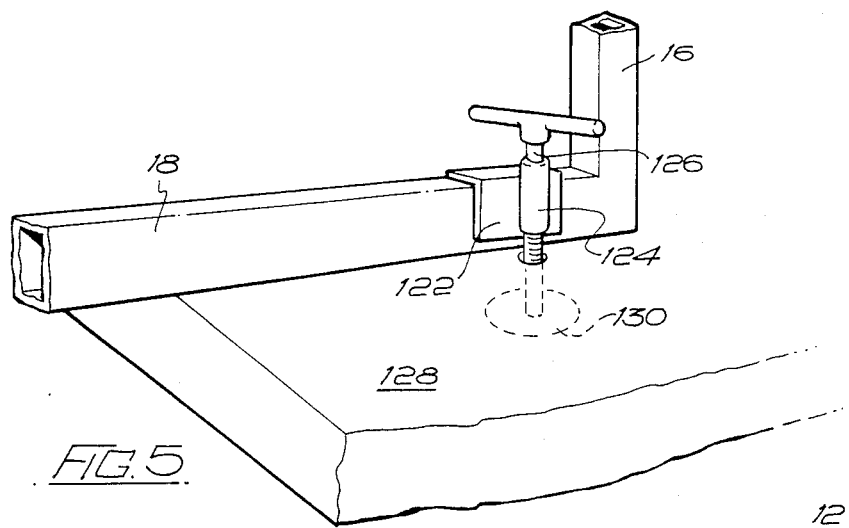
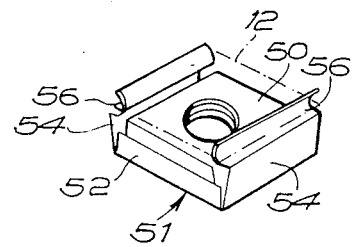
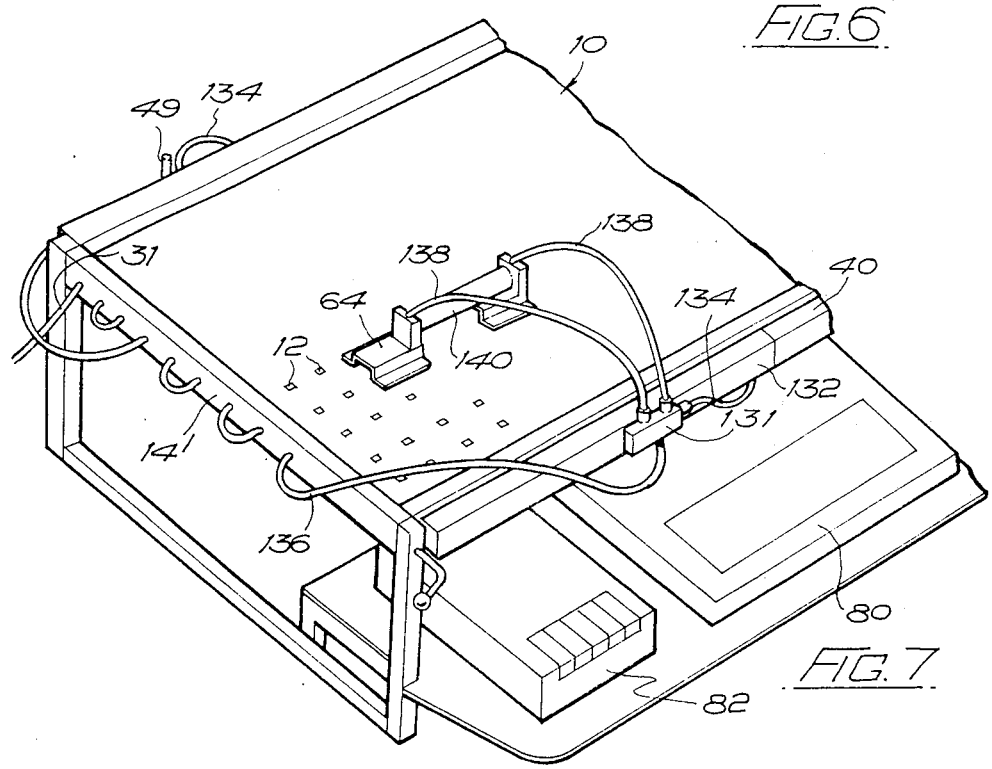

TECHNOLOGY TEACHING APPARATUS

FIELD OF THE INVENTION

The present invention relates to apparatus suitable for use in teaching technology and in particular control technology. This is a subject area which entrails practical experiments and/or demonstrations using parts which move, such as pneumatic cylinders or electric motors together with other components used to control the moving ones. Such components are more or less static. They could for instance include pneumatically operated pneumatic valves, electrically (i.e. solenoid) operated pneumatic valves, electromagnetic relays, electronic circuits and electrical components such as connectors, switches and variable resistors.

This subject area also entails experiments/ demonstrations involving mechanisms, using parts which cooperate to achieve linear and angular motion such as gears, levers, belts and pulleys. Further, this subject area entails experiments/demonstrations relating to structures, in particular to consolidate understanding of design principles and concepts such as strain rigidity and stress. These experiments/ demonstrations could entail structural components such as beams, struts, ties and cantilevers, and also sensors and other static parts such as strain gauges, potentiometers and transducers.

BACKGROUND OF THE INVENTION

There have been various kinds of apparatus previously proposed for teaching technology. However, none have been entirely satisfactory.

SUMMARY OF THE INVENTION

The present inventor has realised the desirability ability of providing a support structure which will facilitate mounting structural, moving and static components as exemplified above, for carrying out these experiments and demonstrations. In particular, the inventor has appreciated the desirability of a support structure able to mount both pneumatic moving parts, and electric or electronic components controlling the pneumatic parts. Or, correspondingly, able to mount structural parts, sensors, and electric or electronic components receiving signals from those sensors. At least in preferred forms the present invention has these abilities.

However, it should be appreciated that the invention can be employed for experiments/demonstrations which do not combine electrics with pneumatics nor electrics with structural items. Thus the apparatus of this invention can be used for experiments in which the moving parts are electrical only, and can be used for experiments in which the control of pneumatic moving parts is performed exclusively by pneumatic valves. Moreover, although pneumatics have been mentioned above, the same considerations would apply if operation was by vacuum rather than by superatmospheric pressure.

Facilitating the mounting of the components employed in experiments is valuable because it avoids two difficulties, either or both of which would otherwise arise. These are (i) expenditure of an excessive amount of time in the assembly of apparatus and (ii) experimental set ups which contain an excessive number of components which are not held in place and are therefore apt to become disconnected accidentally, as well as being generallyy inconvenient.

The provision of apparatus to facilitate the mounting of both pneumatic and electrical or electronic components is particularly valuable in avoiding the second of these difficulties with experiments involving computer control of pneumatic. It is likewise of value in experiments involving computer control of electric motors, or experiments involving connection of electric sonsors to structures.

Components which are attachable to the support area will include components whose function is to convert fluid or electrical energy to movement particularly for the purpose of driving something else, such as pneumatic cylinders and/or electric motors. They can also include mechanisms and parts thereof, such as gears and also electrical sensors such as strain gauges and microswitches. It may also be convenient to mount some static components on the support area. However, the components attached or attachable to the means neighbouring the support area are preferably all components which can be broadly classified as static and not structural. That is to say components where movement is not the primary function, and there is not enough movement to change the size or shape of the components substantially. However, these static components may include such things as electromagnetic relays and pneumatic spool valves where there is movement of internal parts, and also items which are hand operable such as electric switches and hand operated pneumatic control valves.

It is desirable that the static components attachable neighbouring the support area should include electric or electronic items for use in the control of pneumatic moving components attached to the support area.

According to the invention, there is provided a system of technology teaching equipment including a support structure providing both horizontally and vertically disposed support areas with means for the removable attachment of components, at least some peripheral parts of the horizontally disposed support area, or a surface or surfaces by means of which said support area is bounded, being provided with elongate extruded formations in the nature of T-slots for the engagement of complementary parts of the componets or of mounting brackets thereof, and/or for the engagement of the heads of respective fasteners. A part of the working surface of the support structure may be provided with a plurality of small holes for the removable attachment of pneumatic and/or electric/ electronic and/or robotic components thereto by means of fasteners engaging said holes. Means may be provided, neighbouring the support area, for the attachment of static components. Such means may be provided in the form of a shelf extending at least partly beneath the support area hving means for the removable attachment of components. The support area of the structure may be supported by the structure so as to be accessible both from above and below. At least one of members by means of which the support area is bounded may constitute a manifold for air or vacuum. The support structure may be provided with a plurality of electric mains sockets connected to a common lead. A range of components attached or attachable to the support area of the structure may include pneumatic valves and/or electrical or electronic components connected or connectible to a microprocessor or to a microprocessor interfacing unit, and/or robotic components capable of being powered by said pneumatic and/or electrical/electronic components. The support structure may be mounted on wheels, or capable of being mounted on a wheeled frame, so that it can readily be moved from place to place. Alternatively, it may be capable of being mounted on a workbench or the like.

BRIEF DESCRIPTION OF THE DRAWINGS

FIG. 5 is a detail showing securing to a bench;

FIG. 6 is a detail showing a captive nut;

FIG. 7 is a perspective view of part of the platform used to demonstrate operation of a double acting cylinder by means of a spool valve;

FIGS. 9 to 21 are views which illustrate various details or possible further modifications which will be referred to.

DESCRIPTION OF PREFERRED EMBODIMENTS

Figure 1:
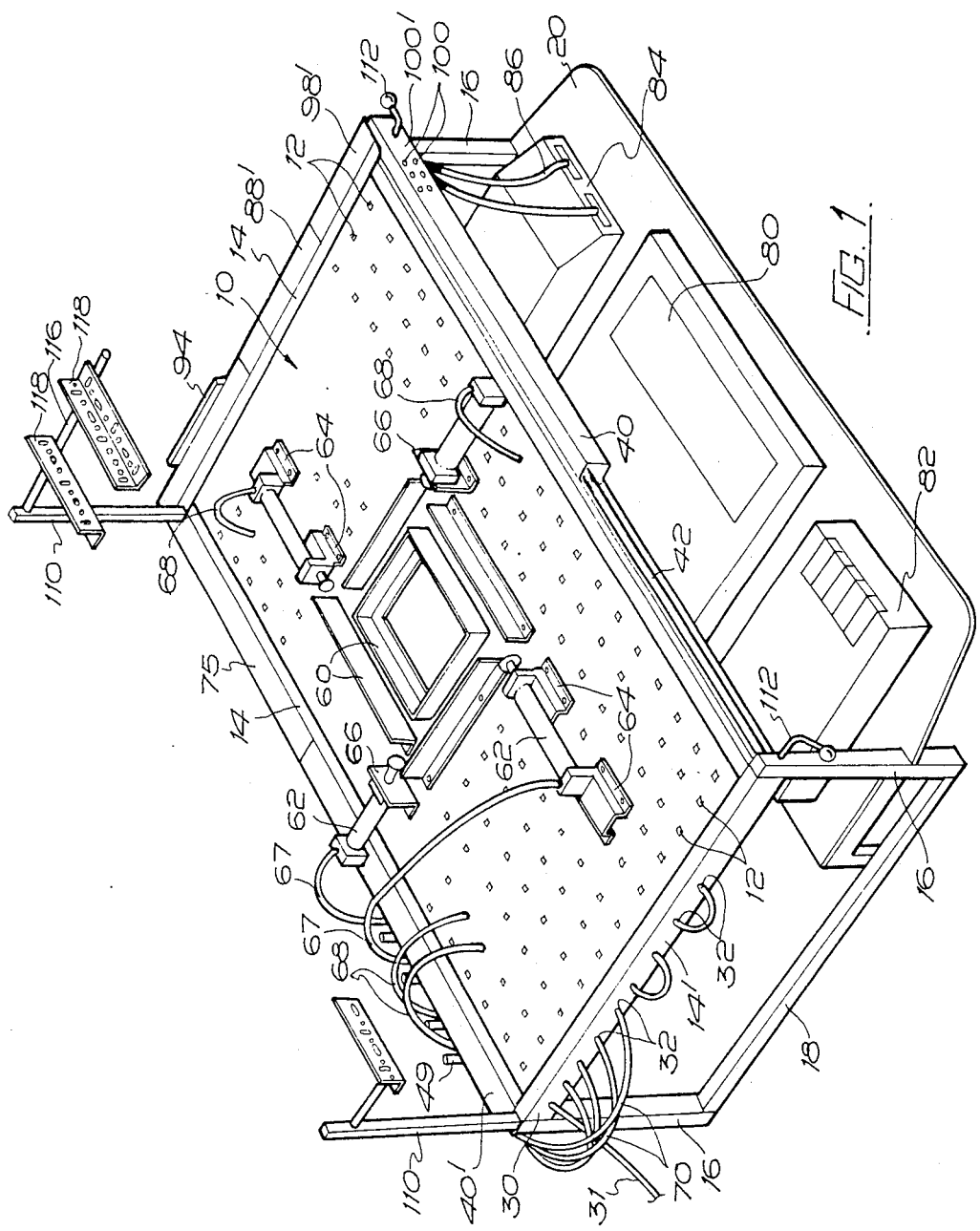
FIG. 1 is a front perspective view of a support structure embodying the invention with experimental apparatus mounted thereon.
Figure 2:
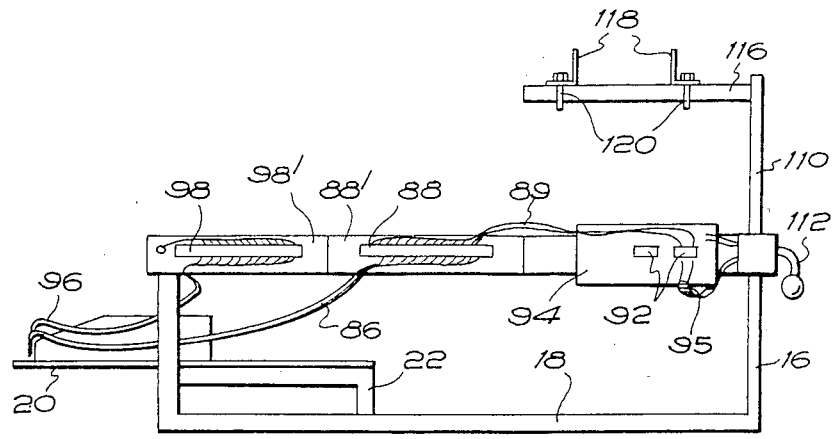
FIG. 2 is a view of the right hand end of the support structure.

The embodiment of the invention illustrated in FIG. 1 of the drawings is a system consisting of a support structure and a range of components which can be attached to that structure.

As can be seen from FIG. 1, the support structure has a support area providing a central working surface 10 consisting of a steel plate punched with an array of square holes 12. The plate 10 is surrounded and supported by a frame welded from lengths of steel box section 14 welded integral with four short legs 16. A cross bar 18 extends between the bottoms of the legs 16 at each end.

The legs 16 are relatively short so that if the structure is placed on a normal table or bench the working surface 10 is still at an accessible height, yet is accessible from below as well as above. In this embodiment the working surface 10 measures 45.5 cm by 99 cm, the legs are 22.5 cm high and the holes 12 are at a regular spacing of 3.8 cm.

Figure 3:
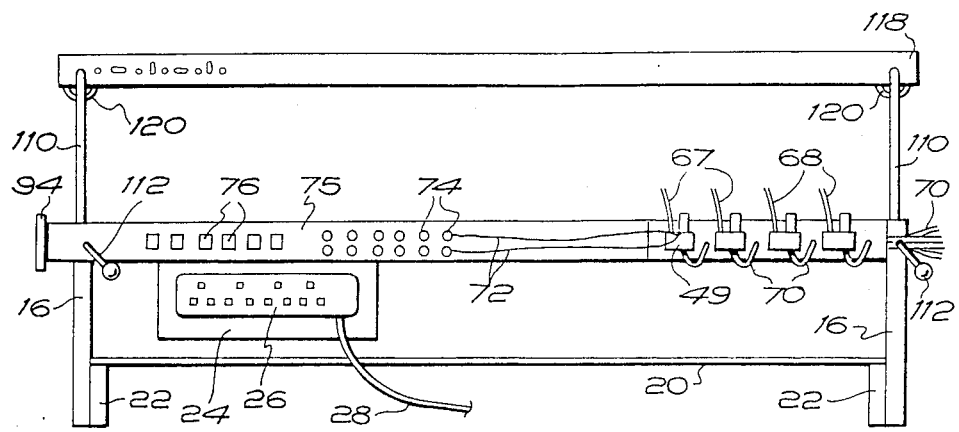
FIG. 3 is a view of the rear of the support structure.

At the front of the support structure there is a shelf 20 arranged to extend partly beneath the working surface 10 and to project somewhat in front of it. This shelf 20 is carried on supports 22 made of square section tubing welded to the bottom bar 18 and to the inside of the front legs 16. As best seen from FIG. 3 a plate 24 welded to the frame at the back of the support structure carries a plurality of mains sockets 26 connected to a common supply cable 28.

The box section 14′ at the left hand end is welded into the frame in such a manner that its interior is sealed from the atmosphere and from the adjoining frame parts. This box section 14′ is then employed as a compressed air manifold. It is provided with an air inlet 30 and a plurality of outlets 32. As shown in the four outlets 32 nearest the front are not being used and these are sealed by connecting them together in pairs. A flexible supply pipe 31 is shown attached to the inlet 30.

Figure 4:
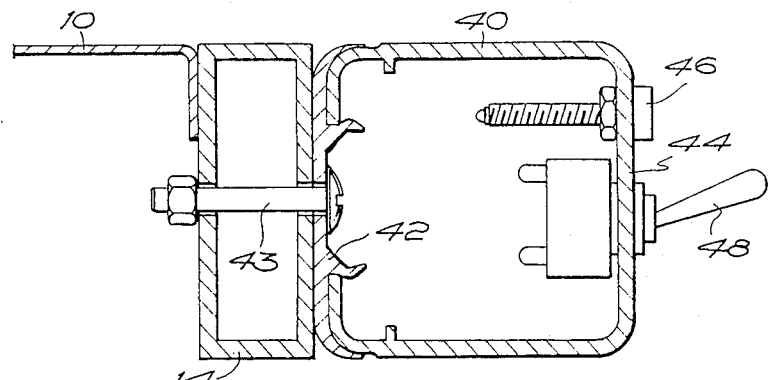
FIG. 4 is a cross section through a frame member and conduit attached thereto.

The remaining box sections 14 are employed to support static components using a snap fitting conduit system illustrated in section in FIG. 4. This consists of a channel section conduit 40 which snap fits onto a base 42. Both the base 42 and the channel 40 are extruded plastics products. A continuous length of the base 42 is fixed, such as by bolts 43 onto the box section 14 along the front of the support structure. Similarly, lengths of the base extrusion are provided along the rear and right hand end box sections 14. This base extrusion is left permanently in place and so it could be held by one-time-only fasteners rather than the bolts 43.

Static components are mounted onto shorter lengths of the channel extrusion 40. Several of these lengths of channel 40, with components thereon, can be snapped onto each length of base extrusion. If these components are of a panel mounting type, they can be fitted to the face 44 of the channel extrusion 40, so that their body which would normally go behind a panel is concealed inside the conduit. Thus, FIG. 4 shows a panel mounting socket 46 and a switch 48 mounted in this way. Other components are mounted onto the outside of the channel extrusion 40, again using its face 44. This is exemplified by the solenoid valves 49 seen in FIG. 3 (and also visible in FIG. 1) mounted on the outside of a length of channel extrusion 40′ at the rear of the support structure.

Components are mounted onto the working surface 10 by means of bolts engaging captive nuts of a type illustrated in FIG. 6. Each captive nut consists of a conventional square nut 50 and a piece of sheet metal bent to form a clip 51 which surrounds and retains this nut. The metal is bent up to form short lugs 52 at each of two opposite sides of the square nut. It also has portions 54 bent up over each of the other two opposite sides, and these bent up portions 54 are continued by two outwardly directed U-bends 56 which partially overlie, and so hold, the nut.

The dimensions are such that the captive nut can be fitted into one of the square holes 12 (shown in platform in FIG. 6) with inward flexing of the portions 54 and released when the U-channels 56 are aligned with the sides of the hole. The metal of the clip 51 then springs back so that the channels 56 engage the metal of the working surface 10 adjacent the hole 12, thereby supporting the nut in place.

When the bolt is inserted into the nut 50 the clip 51 twists slightly within the square hole 12 to a position where it cannot be pulled back through the hole. Then because it holds the nut 50 against rotation the bolt can be screwed down into the captive nut from above without any need for a spanner to hold the nut 50. These captive nuts are commercially available from R.S. Components Limited, London, England.

As shown in the drawings the apparatus is set up for an experiment requiring the sequential operation of four pneumatic cylinders under computer control. Lengths of rigid PVC angle section 60 are bolted to the working surface 10 and define a square track around which a number of cubical wooden bricks (not shown) can be slid, driven by four single acting spring return pneumatic cylinders 62. Two of the cylinders 62 are mounted on channel section brackets 64 which are bolted to the working surface 10, the other two cylinders are mounted by their ends on brackets 66 which are also bolted to the working surface 10. These brackets 66 are used because the other ends of these two cylinders overhang beyond the perimeter of the working surface 10.

The brackets 64, 66 are each provided with slots rather than round holes for the bolts by which they are attached to the working surface 10. This enables adjustment of their position. (These or other brackets with slots may be used for the mounting of other items for other experiments, and the slots enable adjustment of position).

Each of the cylinders 62 is connected by a flexible pipe 67 or 68 to a respective one of the four solenoid valves 49 already mentioned. It will be noted that the flexible pipes 67 can conveniently be carried across from the components (solenoid valves 49) neighbouring the working surface 10 to the moving components (cylinders 62) on the working surface. The two pipes 68 are threaded through holes 12 and run partly under the working surface 10 for the sake of convenience. The four solenoid valves 49 are each supplied by a flexible pipe 70 from the compressed air manifold 14'. Each of the solenoid valves 49 is connected by a pair of wires 72 (only one pair is shown) terminated in plugs which plug into sockets 74 mounted on a length 75 of the channel section. The length 75 also carries 6 plug-in relays 76 which are connected to the sockets 74 by wires inside the channel section.

The microcomputer 80 stands on the shelf 20 between a portable cassette recorder 82 and an interface unit 84, to both of which it is connected. A multi-way output from the interface unit 84 is connected by ribbon cable 86 to a multi-way connecting strip 88 on a length 88' of the channel 40 at the right hand end of the support structure. This connecting strip 88 is connected by further length of ribbon cable 89 to a driver amplifier 90 on the neighbouring length of channel section. This driver amplifier consists to two DIL Darlington driver chips 92 mounted in an electronic breadboard 94 which is secured onto the face 46 of a length of the channel section 40. These Darlington driver chips 92 energise the relays 76, to which they are connected by ribbon cable 95.

The microcomputer 80 cassette recorder 82 and interface unit 84 all plug into the multiple mains socket 26. So also does a low voltage power unit (not shown) providing 12 volt DC to the relays 76.

Although not required to be used in this particular experiment, analogue inputs on the interface unit 84 are connected by a ribbon cable 90 to a multi-way connector 98 and from there by cable to sockets 100 on a length 100' of the channel 40 at the front of the support structure.

Somewhat analogously, a digital input module could be provided on another length of the channel section 40. Such a module could have more sockets 100 for connection to sources of digital signals e.g. electrical microswitches on the working surface 10, and could be connected by ribbon cable through a multi-way connector 98. The digital input module could incorporate electrical components as required, notably resistors serving to protect the computer digital input part from accidental overload.

The multi-way conectors 88, 98 assist in showing which wires of ribbon cable go where, and also can be used in testing that connections have been made correctly.

Where flexible connections, either wires or compressed air pipes, run between components on the conduit, from the manifold 14' to the conduit, they can if desired be kept tidy by running them wholly or partially within the conduit. Thus the tubes 70 enter the end of the channel section length 40' and emerge through holes adjacent each solenoid valve. The ribbon cable 95 to the relays 76 and a 12 v DC supply to the driver chips 92 are carried around the rear right hand leg within the conduit. Similarly wires to the sockets 100 run around the front right hand leg. The channel lengths 75 and 100' are each cut to fit round the legs and hence provide continuous conduit around the right hand corners.

Although not used for the experiment illustrated, a detachable additional structure can be fitted to overlie the working surface 10. The rear legs 16 are hollow and posts 110 telescope within them and are clamped at a desired height by L-shaped clamping bolts 112 which screw into tapped holes in the legs 16. Each post 110 carries a horizontal rod 116 onto which lengths of slotted angle 118 are held by U-bolts 120. The front legs 16 are also hollow and provided with clamping bolts 112 so that posts 110 can be fitted into these as well, if desired. At the right hand corner the bolts 112 pass through channel lengths 75 and 100'.

The support structure is dimensioned so that it can stand with all four legs on many normal tables or benches. However, the presence of the bottom bar 18 allows it to project over the front of a table or bench, and use of a single clamp as shown in Figure 5 allows it to be cantilevered out some distance over the front of the bench. The clamp consists of a length of angle iron 122 welded to a sleeve 124 through which a threaded rod 126 with a handle passes. This rod is passed through a hole drilled in the bench top 128 and screws into a large nut 130 (a disc with a central tapped hole) on the underside of the bench top 128.

For other experiments different types of pneumatic valves could be provided, fitted onto lengths of the channel section 40. Examples of such valves are pilot operated spool valves 5/2, lever spool valves, button operated valves and solenoid operated spool valves. Examples of electrical components which could be mounted onto lengths of channel section are Breadboard for construction of electronic circuits, V.I.A. interface modules, driver and amplifier modules, resistors, capacitors etc.

The experiment in FIG. 7 illustrates use of an all pneumatic valve, in this case a pilot operated spring return spool valve 131. This is mounted on a length 132 of channel section. Its pilot supply comes from a solenoid valve 49 through pipe 134 running under the working surface 10. It is connected directly to the manifold 14' by means of pipe 136 and two pipes 138 connect it to a double acting cylinder 140.

This arrangement could of course be incorporated into a more extensive experiment run under computer control.

The system of apparatus shown in FIGS. 1 to 7 has numerous advantages, and the following features may be noted in particular:

1. The system mounts both pneumatic and electrical/electronic components juxtapositioned in a practical and useful way.

2. The system can mount structural components and/or mechanisms, which can be connected to electrical/electronic components, once again juxtapositioned in a useful manner.

3. The system enables the aforementioned components to be linked conveniently to a microcomputer.

4. The system employs two standardised mounting systems, viz. bolts into captive nuts on the working surface 10, and snap fitting of channel lengths around the frame neighbouring the working surface.

5. The major part of the working surface is a smooth plate with relatively small holes and no permanent upward projections, allowing workpieces to slide over it.

6. The system, utilising adjustable mountings, accommodates the fixing of a substantial range of diverse parts.

7. The system provides mountings above the working surface.

8. Flexible links onto the working surface (wires or compressed air tubes) run from components positioned neighbouring the working surface, and which serve to anchor their end of the flexible link.

9. The working surface 10 does not have to accommodate the computer, nor all the static components, yet these are conveniently close. To put this another way, the working area available to a student is no longer the single plane of a bench or table top.

10. There is only one connection to an external main socket and only one connection to an external compressed air supply.

11. The supporting structure is economical to manufacture.

12. When stored the supporting structure requires less space than a piece of dedicated, floor-standing furniture (although this invention can also be embodied in a floor-standing structure with longer legs, when that is desired).

Figure 8:
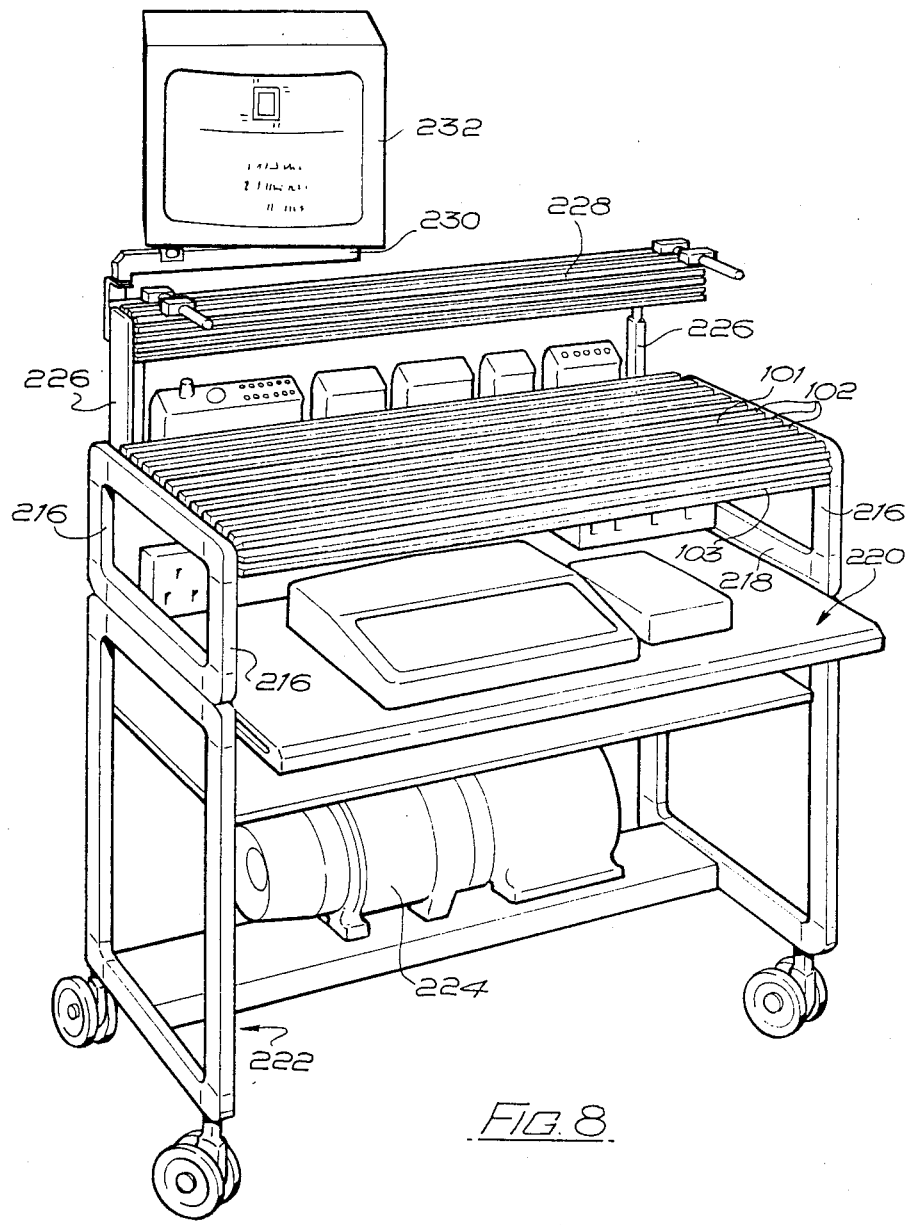
FIG. 8 is a view similar to FIG. 1 but illustrating a modified arrangement.

Referring now to FIG. 8, this illustrates a modified arrangement in which the entire support area 101 of the support structure is provided with elongate extruded formations constituting means for the removable attachment of components. The elongate extruded formations are a plurality of T-slots 102 and these are provided at the exposed top surface of a length of extruded material (or two or more lengths of extruded material clamped side by side) which forms the support area. A front surface 103 of the length of extruded material, by means of which the support area is bounded, is also provided with a plurality of the T-slots 102, these constituting a part of the means for the removable attachment of components at the front of the support structure. As shown, in this arrangement the support area is spaced on four shorts legs 216 above a shelf 220 on which, as in the first described embodiment, equipment such as a microprocessor, and/or a portable cassette recorder, and/or an interface unit can stand. The shelf 220 is slidably mounted in the support structure, the arrangement being such that the shelf can be partially withdrawn, to the limit allowed by a pair of stops, to give easy access to whatever equipment is mounted on the shelf and to a number of electrical sockets just visible in FIG. 8. Beneath the shelf 220, there is in this embodiment a wheeled trolley structure 222 on which the arrangement can very easily be moved about from place to place where it may be required for use. Housed in a lower part of the wheeled trolley structure is an electric motor driven air compressor 224 for providing air under pressure when carrying out experiments involving the use of pneumatic rams and/or compressed air motors. A hydraulic power supply (not shown) may also be housed in the lower part of the trolley.

As in the first described embodiment, the structure is provided with a pair of upstanding posts 226. However, in this case, additional structure 228 in the form of a T-slotted length of extruded material is bolted to the posts 226, as shown, and a cantilevered support 230 is shown to carry a video display unit 232.

The support structure illustrated has a front to back width across the horizontal support area in the range of from 330 to 70 cm. and a lateral width greater than the front to back width. The support structure can however vary in size considerably according to where it is to be used.

Although not illustrated in FIG. 8, it will be understood that, when the structure is in use, the support area can be used for the mounting of both pneumatic and electrical/electronic components in a practical and useful way for carrying out experiments and/or demonstrations of various kinds. Examples of the ways in which such components can be mounted can be seen in FIG. 9. For example, a solenoid valve 234 is shown to be carried by a mounting bracket 236 on the front surface of an extruded length of material which bounds the support area, the mounting bracket being secured to said front surface by means of four fasteners 238. A different component 240 is shown to be secured by means of a similar mounting bracket on the top surface of the support area. Other components are shown to be carried by such mounting brackets, but these are not secured directly to the support area of the structure but to intermediate lengths of extruded section located in other planes, all of which have the T-slot formations by means of which they can very quickly and easily be connected together and to the support area.

Figure 9:
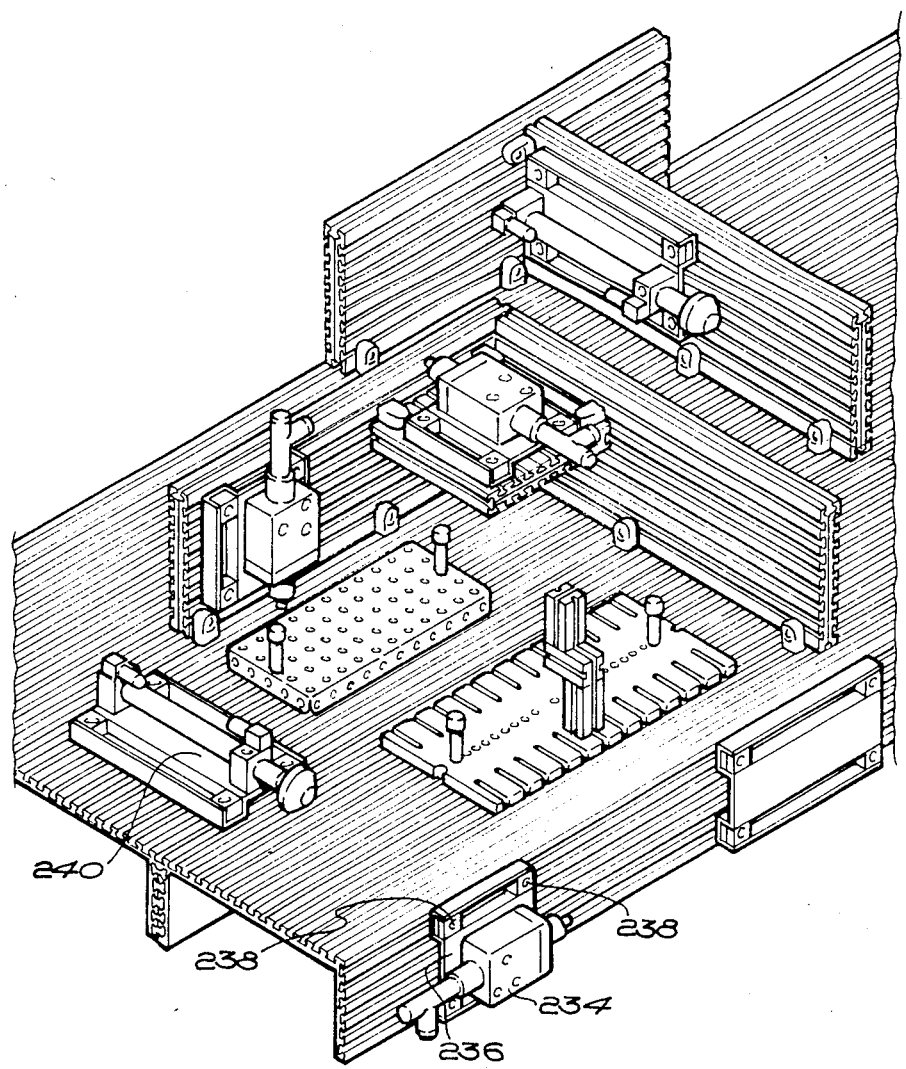
Figure 10:
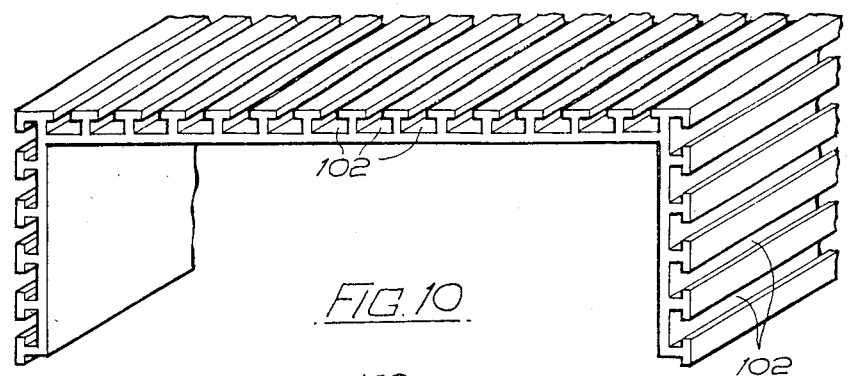
Figure 11:
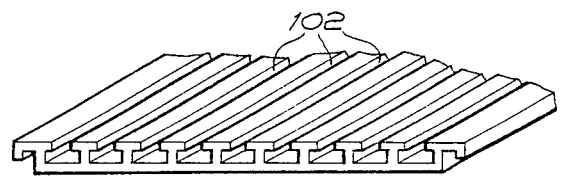
Figure 12:
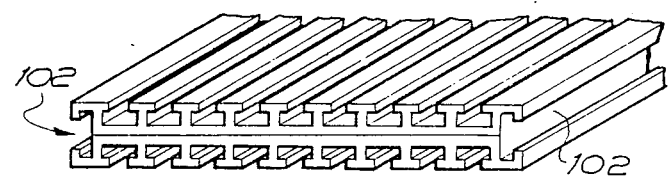
Figure 13:
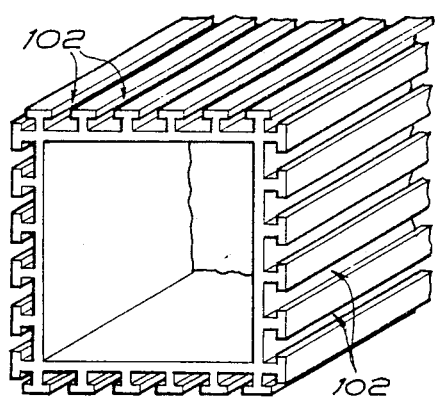
Figure 14:
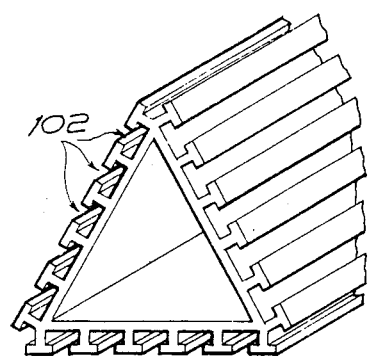

Various kinds of extruded section which either form part of the support structure or which can be used on the support structure for the mounting of various components are illustrated by way of example in FIGS. 10 to 14. The section illustrated in FIG. 10, and which is of generally inverted channel section, is similar to the section of which the support area is shown to be composed in FIG. 9. The section illustrated in FIG. 11 can be used in back to back pairs as shown in FIG. 12 (and also as shown in FIG. 9). The sections illustrated in Figures 12 and 14 are not shown in use in any of the other figures but are of generally box section and generally triangular section respectively and can be used as and when appropriate to the carrying out of particular experiments and/or demonstrations. All of the extruded sections illustrated are provided, as shown, with a plurality of the T-slots 102 facilitating their attachment to the support structure, or to the remainder of the support structure of which they form a part, and/or for the removable attachment of components, that is to say pneumatic, hydraulic and/or electrical/ electronic components, or in fact robotic components capable of being powered by the pneumatic, hydraulic and/or electrical/electronic components.

Figure 15:
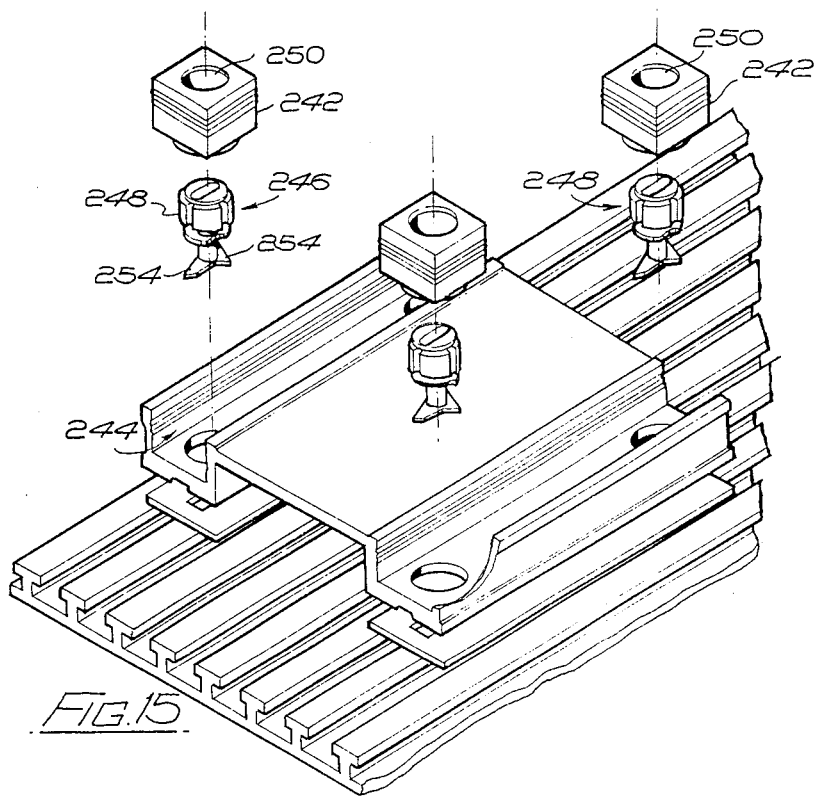
Figure 16:
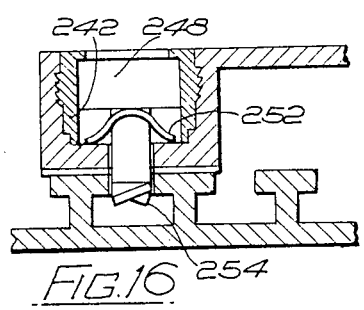
Figure 17:
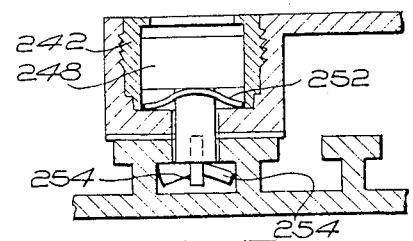

In FIGS. 15 to 17 there is illustrated in exploded detail and scrap section the manner in which the quick release fasteners 238 operate. As shown, each fastener includes a retainer member 242 with serrated side walls by means of which it can be located in position in channels 244 with similarly serrated side walls in the mounting bracket concerned. Each fastener also includes a lockable T-bolt member 246 with an operating portion 248 captive within a counterbore portion of the retainer member concerned. An operating key (not shown) can be passed through an aperture 250 in the retainer member to engage an elongate slot in the operating portion of the T-bolt member. The key can then be pressed downwards and turned, first to force the T-bolt member downwards from the position in which it is shown in FIG. 16, against the force of a dished plate spring 252, and then to turn it so that inclined wing elements 254 at its lower end are caused to engage the surfaces of the T-slot concerned as shown in FIG. 17.

Figure 18:
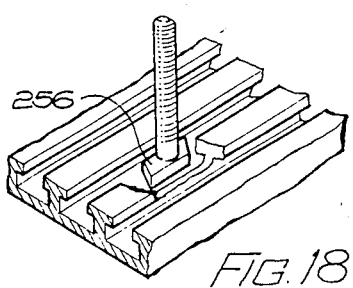
Figure 19:
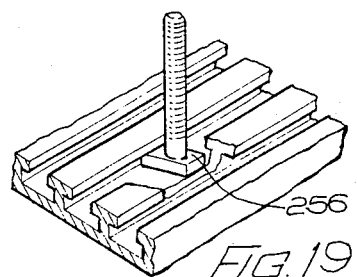

In FIGS. 18 and 19 there is illustrated a different kind of fastening element which may be used for fixing the various sections to the support area of the structure and/or for removably attaching the various components thereto, the fastening element being constituted by a T-bolt having a special shaped head 256 for engaging the T-slots. The head of the T-bolt is parallel sided so that it can be inserted into one of the T-slots from above as shown in FIG. 18. The opposite end surfaces of the head are, however, not at right angles to the side surfaces; they are inclined at an angle so that the head of the bolt can be turned within the slot to bring it into a wedging position as shown in FIG. 19.

Figure 20:
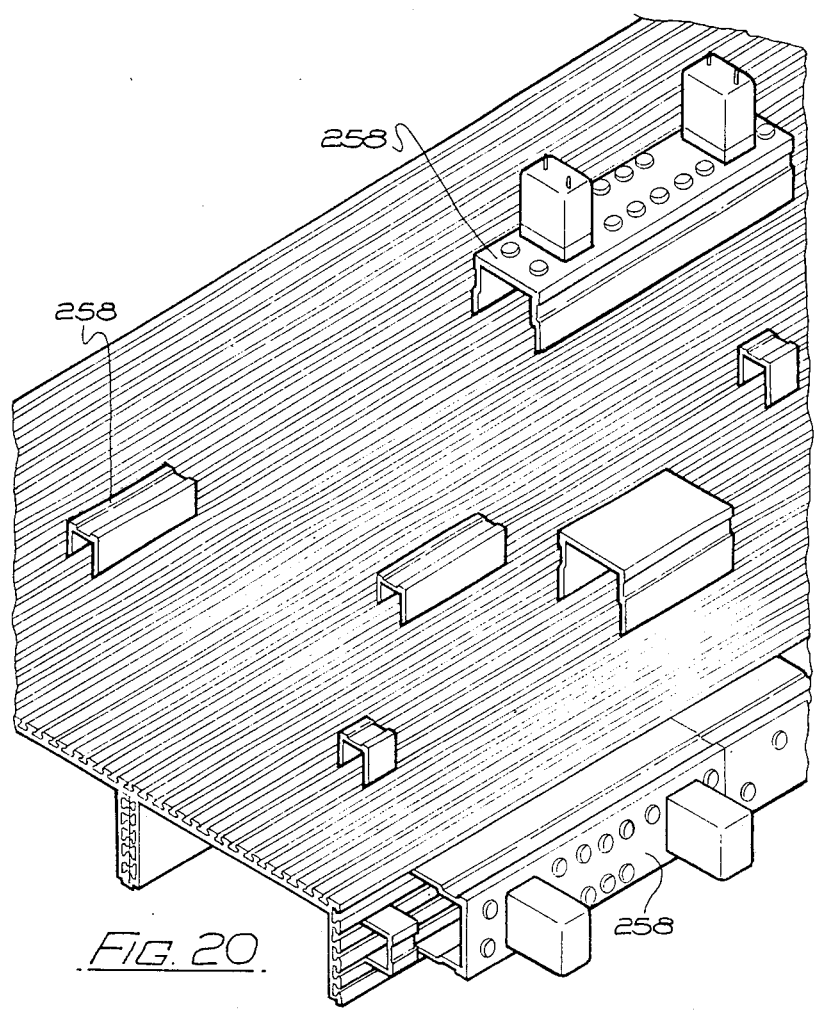
Figure 21:
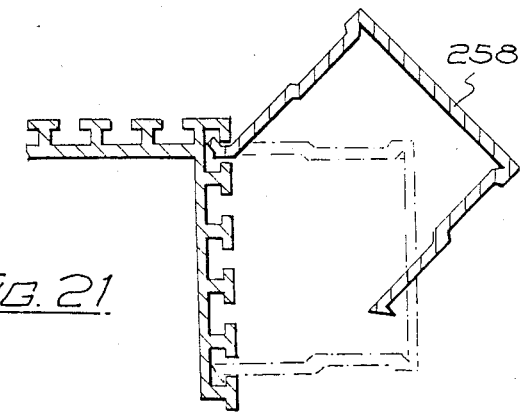

Referring now to FIGS. 20 and 21, these illustrate the use of other kinds of mounting brackets 258, the latter being of inverted channel section and having side walls so shaped that they can engage the undercut form of the T-slots of the support structure. In FIG. 21 there is illustrated the manner in which such a mounting bracket can be engaged with the slotted front surface of the extruded section forming a part of the support area, an upper wall of the bracket being engaged with one of the T-slots, as shown, before a lower wall of the bracket is engaged with one of the T-slots at a lower level. Such a mounting bracket can then remain in position by gravity. The kind of mounting bracket just described is very useful in keeping tidy and hiding from view the electric wiring to electrical/electronic components and the air lines to pneumatic components.

Provision is made for the removable attachment of the upper part of the support structure illustrated in FIG. 8 (that is to say the support area and the four short legs 216) from the wheeled trolley so that the upper part of the structure can be mounted on a bench top if desired.

It will be observed that, as in the first described embodiment, a cross bar 218 extends between the bottoms of the legs 216 at each end. Thus, when the upper part of the structure has been detached from the wheeled trolley, it can be placed on a table or bench and can extend forwardly of the latter to some extent. However, it will be understood that it is not essential for the opposite ends of said upper part of the opposite ends of the trolley structure to be provided with four sided frame parts as illustrated in FIG. 8. It would be quite possible, and indeed desirable, for the forwardly locating upstanding frame parts to be omitted, this then making the available space within the structure more accessible.

Various other modifications may be made. For example, the wheeled trolley structure, instead of or in addition to the motor driven air compressor shown in FIG. 8, and the hydraulic power pack which can be fitted, could be provided wtih storage trays for the storage of pneumatic, electronic and robotic components. The structure can also be fitted with lockable doors.

Thus there is provided a system of technology teaching equipment bringing together in a practical and useful way pneumatic, hydraulic and electrical services, together with electronic systems and computer control whereby they are able to be combined in numerous ways on a very simple but versatile support structure.

What I claim and desire to secure by Letters Patent is:

1. A system of technology teaching equipment including a support structure providing both horizontally and vertically disposed support areas with means for the removable attachment of components, at least one side surface by which said horizontal support area is bounded being provided with elongate extruded formations in the nature of T-slots for the engagement of complementary parts of the components and of mounting brackets therefor, and for the engagement of the heads of respective fasteners.

2. A system of technology teaching equipment according to claim 1, in which a part of the working surface of the support structure is provided with a plurality of small holes for the removable attachment of pneumatic and electric/electronic and robotic components thereto by means of fasteners engaging said holes.

3. A system of technology teaching equipment according to claim 2, in which means are provided, neighbouring the support area, for the attachment of static components.

4. A system of technology teaching equipment according to claim 3, in which the means provided for the attachment of static components are provided in the form of a shelf extending at least partly beneath the support area having means for the removable attachment of components.

5. A system of technology teaching equipment according to claim 1, in which the support area of the structure is supported by the structure so as to be accessible both from above and below.

6. A system of technology teaching equipment according to claim 1, in which at least one of the members by means of which the support area is bounded constitutes a manifold.

7. A system of technology teaching equipment according to claim 1, in which the support structure is provided with a plurality of electric mains sockets connected to a common lead.

8. A system of technology teaching equipment according to claim 1, including a range of components attachable to the support area of the structure, the range of components including pneumatic valves and electrical/electronic components connectible to a microprocessor/microprocessor interfacing unit, and robotic components capable of being powered by said pneumatic/electrical/electronic components.

9. A system of technology teaching equipment, according to claim 1, in which the support structure is mounted on wheels so that it can readily be moved from place to place.

10. A system of technology teaching equipment according to claim 1, in which the support structure is capable of being mounted on a workbench or the like.

* * * * *